Patented Nov. 2, 1948

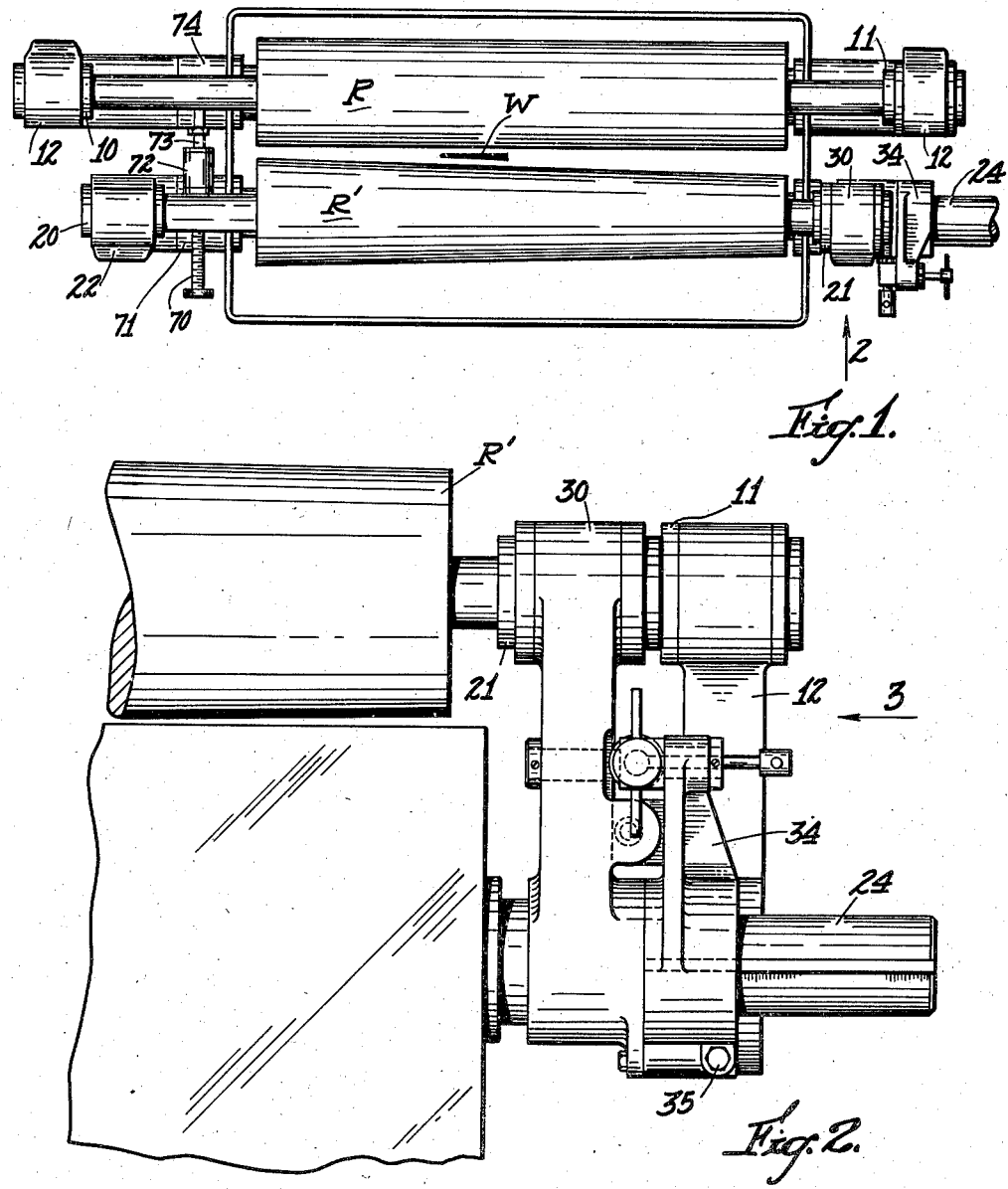

2,452,976

UNITED STATES PATENT OFFICE 2,452,976

ROLL ADJUSTING MECHANISM

Forrest R. Whitcomb, Worcester, Mass.

Application February 26, 1947, Serial No. 731,147

5 Claims. (Cl. 51—80)

This invention relates to machines for glazing knife blades and other metal products. In such machines the work is vertically reciprocated between a pair of polishing rolls which are mounted to swing horizontally toward and away from the work. If the work blade is of uniform transverse thickness, the polishing surfaces of the rolls should be parallel but if the blade is of tapered transverse section, the adjacent surfaces of the rolls should be at a corresponding slight angle.

For such tapered work, one cylindrical roll and one slightly tapered roll are commonly provided, but the angle between the polishing surfaces does not always correspond exactly to the taper of the blade section.

It is the general object of my invention to provide means by which the angular relation between the axes of two substantially paralled polishing rolls may be altered to such extent as is necessary to cause the adjacent roll surfaces to provide an included angle exactly corresponding to the cross section of the blade or other work to be glazed or polished.

A further object is to provide for such relative adjustment without interference with the usual swinging movements of the rolls or with the continued rotation thereof.

My invention further relates to arrangements and combinations of parts which will be hereinafter described and more particularly pointed out in the appended claims.

A preferred form of the invention is shown in the drawings, in which

Fig. 1 is a top plan view of a pair of polishing rolls.

Fig. 2 is an enlarged partial front elevation, looking in the direction of the arrow 2 in Fig. 1.

Figure 3:
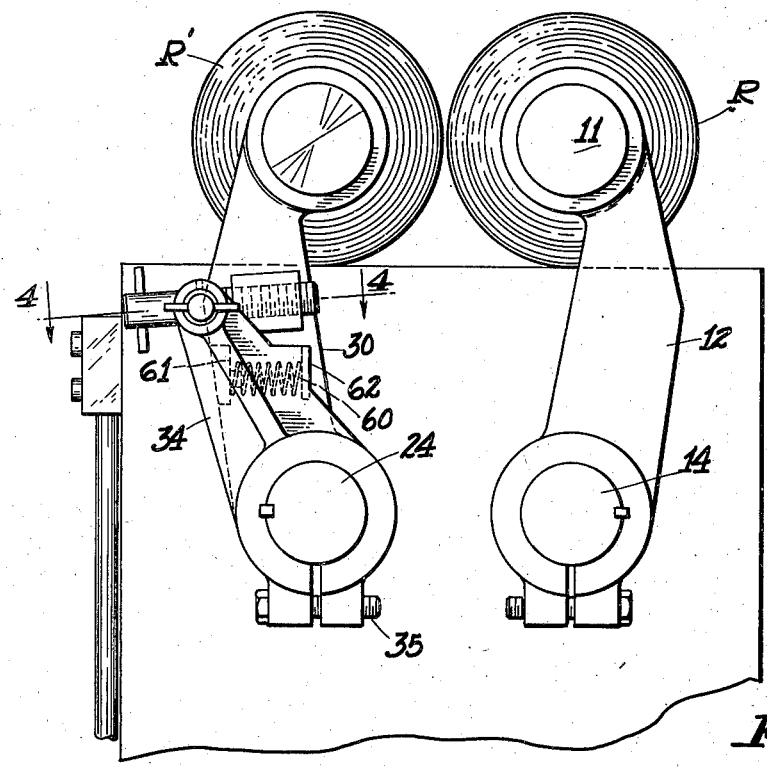
Fig. 3 is an end view, looking in the direction of the arrow 3 in Fig. 2.

Referring to Fig. 1, I have shown a piece of work W positioned between a cylindrical roll R and a slightly tapered roll R'. The roll R rotates in self-aligning anti-friction or ball bearings 10 and 11, mounted at the upper ends of arms 12, which in turn are keyed to a rock shaft 14 (Fig. 3). The roll R' is similarly rotated in self-aligning anti-friction or ball bearings 20 and 21 (Fig. 1), and the bearing 20 is mounted in an arm 22 which is keyed to a second rock shaft 24 (Fig. 3).

The second bearing 21 for the tapered roll R' is mounted in an arm 30 which is centered on the shaft 24 but is free for angular adjustment relative thereto. A short arm 34 is keyed to the shaft 24 and is made fast thereto by a clamping screw 35.

Figure 4:
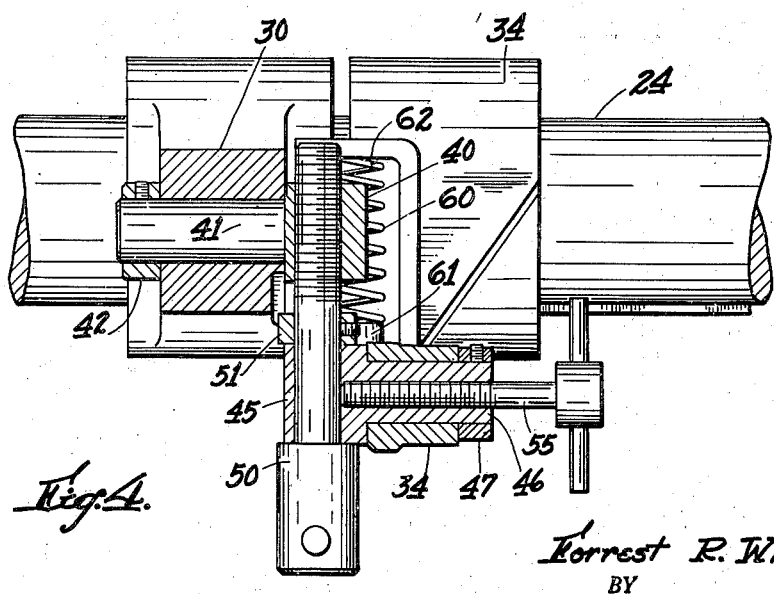
Fig. 4 is an enlarged sectional detail, taken along the line 4—4 in Fig. 3.

The connecting devices through which the angular relationship of the arms 30 and 34 may be varied will now be described. A swivel nut 40 (Fig. 4) is provided with a shank 41 which is pivoted in a bearing in the arm 30 and which is secured therein by a collar 42. A swivel bearing 45 is similarly provided with a shank 46 extending through a bearing in the short arm 34 and is secured therein by a collar 47.

A headed adjusting screw 50 extends through the swivel bearing 45 and is threaded into the swivel nut 14. The screw 50 is rotatable in the swivel bearing 45 but is held from longitudinal displacement therein by a collar 51. A set-screw 55 is threaded in the swivel bearing shank 46 and engages the bearing portion of the adjusting screw 50.

A coil spring 60 is mounted between opposed surfaces or abutments 61 and 62 on the arms 34 and 30, and acts to take up lost motion between these parts by forcing them yieldingly apart.

The limit of approach of the rolls to each other may be determined by an adjusting screw 70 (Fig. 1) mounted on a member 71 keyed to the shaft 24. The screw 70 has a head 72 engaging a stud 73 fixed in a similar arm 74 keyed to the shaft 11. Engagement of the parts 72 and 73 limits the approach of the rolls to each other, and this approach may be varied by changing the setting of the screw 70.

During the operation of the machine, the shafts 14 and 24 are rocked by any usual power means to cause the rolls R and R' to alternately approach and recede relative to each other.

In order to adjust the angle between the polishing surfaces, the set-screw 55 is loosened and the adjusting screw 50 is turned in one direction or the other to change the angle between the arm 34 which is fixed to the rock shaft 24 and the arm 30 which is loose on said shaft and supports the roll bearing 21. By such adjustment the self-aligning bearing 21 of the roll R' may be shifted toward or away from the shaft 11 and roll R, while the bearing 20 of the roll R' remains unchanged in position, except for a very slight self-aligning swivel movement.

The roll R' may be cylindrical instead of slightly tapered, or both rolls may be slightly tapered, all within the scope of my invention.

I have thus provided a very simple, durable and efficient mechanism by which the angular relation of the adjacent active surfaces of the rolls R and R' may be adjusted to the exact transverse section of the work, while at the same time the bearings of the roll R' automatically maintain their alignment and there is no interference with continuous rotation of the rolls.

Having thus described my invention and the advantages thereof, I do not wish to be limited to the details herein disclosed, otherwise than as set forth in the claims, but what I claim is:

1. In a glazing and polishing machine, a pair of coacting polishing rolls, self-aligning bearings for said rolls, supporting arms for said bearings, rock shafts on which said supporting arms are mounted for movement by said rock shafts toward and away from each other, and separate means to shift one of said arms and bearings angularly relative to the rock shaft on which it is mounted to change the axial relation of said rolls to each other.

2. The combination in a glazing and polishing machine as set forth in claim 2, in which the shiftable supporting arm is loose on its rock shaft and in which an adjacent short arm is fixed to said rock shaft and in which a screw-threaded member connects said adjacent arms and is effective to change the angular relation of said arms to each other.

3. In a glazing and polishing machine, a pair of coacting polishing rolls, self-aligning bearings for said rolls, supporting arms for said bearings, a rock shaft to which the supporting arms for one roll are fixed, a second rock shaft to which one of the supporting arms for the second roll is fixed and on which the second supporting arm for said second roll is pivoted, a short arm fixed to said second rock shaft adjacent said second supporting arm, means to shift said second supporting arm angularly relative to said short arm, and means to secure said parts in a selected angular relation.

4. In a glazing and polishing machine, a pair of coacting polishing rolls, self-aligning bearings for said rolls, supporting arms for said bearings, a rock shaft to which the supporting arms for one roll are fixed, a second rock shaft to which one of the supporting arms for the second roll is fixed and on which the second supporting arm for said second roll is pivoted, a short arm fixed to said second rock shaft adjacent said second supporting arm, a nut swivelled in said second supporting arm, an adjusting screw threaded in said nut and having a bearing in a bearing block swivelled in said adjacent short arm, and means to hold said screw from axial displacement in said bearing block.

5. In a glazing and polishing machine, a pair of coacting polishing rolls, self-aligning bearings for said rolls, supporting arms for said bearings, a rock shaft to which the supporting arms for one roll are fixed, a second rock shaft to which one of the supporting arms for the second roll is fixed and on which the second supporting arm for said second roll is pivoted, a short arm fixed to said second rock shaft adjacent said second supporting arm, a nut swivelled in said second supporting arm, an adjusting screw threaded in said nut and having a bearing in a bearing block swivelled in said adjacent short arm, means to hold said screw from axial displacement in said bearing block, means to retain said adjusting screw in a selected position, and yielding means effective to force said adjacent arms apart to take up back-lash.

FORREST R. WHITCOMB.

REFERENCES CITED

The following references are of record in the file of this patent:

UNITED STATES PATENTS

| Number | Name | Date |
| --- | --- | --- |
| 2,036,900 | Waldron | Apr. 7, 1936 |
| 2,123,171 | Hamilton | July 12, 1938 |